Dec. 12, 1939.　　　　P. WIEBICKE　　　　2,183,284
FUEL-INJECTION PLUG-NOZZLE FOR DIESEL MOTORS
Filed July 27, 1938
Fig. 1　　Fig. 4　　Fig. 7
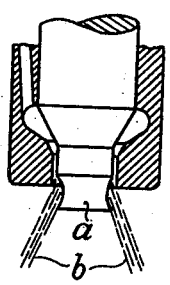 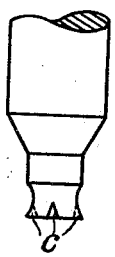 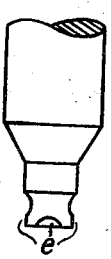
Fig. 2　　Fig. 5　　Fig. 8
  
Fig. 3　　　　　　Fig. 9
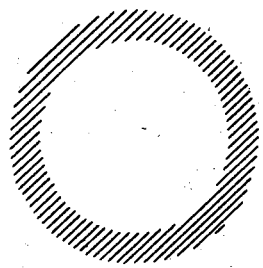 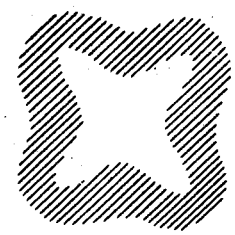
Fig. 6
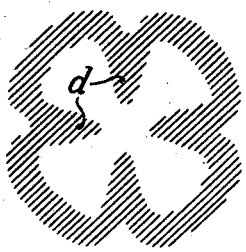
INVENTOR:
PAUL WIEBICKE
By: Alfred Müller
Attorney Patented Dec. 12, 1939

2,183,284

UNITED STATES PATENT OFFICE 2,183,284

FUEL-INJECTION PLUG-NOZZLE FOR DIESEL MOTORS

Paul Wiebicke, Nuremberg, Germany

Application July 27, 1938, Serial No. 221,543
In Germany July 28, 1937

3 Claims. (Cl. 299—107.1)

The known so-called plug-nozzles which are provided with a conical end extending towards the combustion space of the motor produce a practically conical fuel-jet in which the density of the fuel present in, and forming, the convex surface of the fuel-cone is greater than the density of the fuel in the interior of this cone which practically does not contain any fuel at all in its core. This constitutes a drawback especially with such motors in which the fuel is injected into a combustion space, the outer wall of which is comparatively cool, whereas there is in the middle portion of said space a higher temperature originating from the undisturbed density core which is not detrimentally affected by said cool outer wall of the combustion space, although that core is not sufficiently supplied with fuel.

The object of the present invention is to overcome this drawback, that is to say, to supply a sufficient amount of fuel also into the interior of the fuel-cone. I attain this object by combining, or providing, the conical end of the plug-nozzle with an extension having an enlarged diameter and being so shaped at the circumferential surface of this enlarged end as to be able to direct the fuel also into the central portion of the cone formed by the fuel injected into the combustion space around said extension. Said circumferential surface may have flattened portions or notches or the like, the position and shape of these added configurations being always such that the fuel is not injected wholly or chiefly into the convex portion of the fuel-cone, but also into the central portion thereof, whereby the object sought to be attained is attained completely in the desired measure, as is true also of the action of the efficiency of the motor.

I am aware of the fact that notches, incisions and the like have already been provided at the so-called needles of fuel-nozzles but the place where said additions have been provided is not an extension located at the conical end of a plug-nozzle and having an enlarged diameter opposite the combustion space, but the configuration of the nozzle-needle where there are the said additions is just the reverse of the configuration of the present improved plug-nozzle, so that the said known needles are not able to render the effect intended and attained with the present improved ones designed as more fully dealt with hereinafter and shown by way of example on the accompanying drawing on which I have shown, besides plug-nozzles designed according to this invention, also one of the known nozzles in order to make matters completely clear. Figure 1 is a longitudinal section through that known plug-nozzle. Figure 2 is a plan, or a front-view, of the nozzle-end proper (without the nozzle body and the members adjacent thereto). Figure 3 shows in hatched lines and on a greatly enlarged scale a transverse section through the fuel-jet (more precisely, through the convex portion thereof) produced by the said known nozzle. Figure 4 is a view similar to Fig. 1 (without the parts surrounding the nozzle), but shows at its lowermost end the configuration of a plug-nozzle designed according to this invention. Figure 5 is a plan, or a front-view, of the nozzle-end proper. Figure 6 is a view similar to Fig. 3 and shows, likewise in hatched lines and on a greatly enlarged scale, a transverse section through the fuel-jet produced by this other nozzle. Figure 7 is also a view similar to Fig. 1 (or 4 respectively) and shows a modification of the nozzle-end. Figure 8 is a front-view, or a plan, of this modified nozzle-end, and Figure 9 shows again in hatched lines and on a greatly enlarged scale a transverse section through the fuel-jet as produced by said modification.

Referring first to Figs. 1 and 2, the conical end $a$ of the plug-nozzle produces a jet having the configuration of a hollow cone, of which the first portion is indicated by the reference letter. This configuration appears also from Fig. 3, as already mentioned in the short description of the figures. If the end of the nozzle is, however, provided, for instance, with incisions or notches like, or similar to, $c$ in Figs. 4 and 5, the transverse configuration of the fuel-jet will be that shown in Fig. 6, and if the nozzle-end is provided, for instance, with flattened portions like, or similar to, $e$ in Figs. 7 and 8, the transverse configuration of the fuel-jet will be that shown in Fig. 9. The fuel portions streaming through the notches $c$ or along the flattened portions $e$ will approach, or even get into, the centre of the jet, as intended, whereby the intended effect will be attained very satisfactorily.

I claim:

1. A Diesel-motor, fuel-injection nozzle comprising a needle valve stem having a conical end for cooperation with a seat to regulate the amount of fuel injected, and an extension of smaller diameter than said needle valve stem projecting from said conical end, the outer end portion of said extension flaring toward its outer end to cause the injected fuel to be delivered in the form of a hollow, conical jet, said extension further having side recesses opening at their outer ends through the outer end of said extension to permit some of the injected fuel to be delivered into the interior of the hollow, conical fuel jet, the inner ends of said recesses being disposed outwardly of the inner end of said flaring portion of said extension so that the fuel before passing through said recesses is directed laterally outward.

2. A Diesel-motor, fuel-injection plug-nozzle as set forth in claim 1 in which the side recesses in the extension are in the form of substantially V-shaped notches.

3. A Diesel-motor, fuel injection plug nozzle as set forth in claim 1 in which the extension has flattened side portions providing the side recesses.

PAUL WIEBICKE.